United States Patent [19]

Kaplan

[11] Patent Number: 5,307,692

[45] Date of Patent: May 3, 1994

[54] WORKSTATION AT A PACKAGING MACHINE

[75] Inventor: Horst E. Kaplan, Oerlinghausen, Fed. Rep. of Germany

[73] Assignee: Klockner Hansel GmbH, Hanover, Fed. Rep. of Germany

[21] Appl. No.: 889,443

[22] Filed: May 27, 1992

[30] Foreign Application Priority Data

May 29, 1991 [DE] Fed. Rep. of Germany ....... 4117542

[51] Int. Cl.$^5$ ................................................. G01L 1/00
[52] U.S. Cl. ............................ 73/862.541; 73/862.53; 53/77; 53/453
[58] Field of Search ................... 73/862.541, 862.542, 73/862.382, 862.641, 862.53, 862.621, 862.622; 53/453, 559, 77

[56] References Cited

U.S. PATENT DOCUMENTS

| | | | |
|---|---|---|---|
| 3,918,301 | 11/1975 | Baer | 73/862.53 |
| 4,016,744 | 4/1977 | Williams et al. | 73/862.53 X |
| 4,062,169 | 12/1977 | Lister et al. | 53/124 D |
| 4,432,246 | 2/1984 | Granat | 73/862.541 X |
| 4,511,044 | 4/1985 | Connor et al. | 73/862.53 X |
| 4,519,256 | 5/1985 | Daniels | 73/745 |
| 4,523,483 | 6/1985 | Brankamp et al. | 73/862.542 |
| 4,557,149 | 12/1985 | Bird et al. | 73/862.541 |
| 4,856,327 | 8/1989 | Branam et al. | 73/862.49 |
| 4,864,876 | 9/1989 | Botzolakis et al. | 73/862.541 |
| 4,885,901 | 12/1989 | Sakaki et al. | 53/589 |
| 4,939,665 | 7/1990 | Gold et al. | 73/862.53 X |
| 4,989,462 | 2/1991 | Davis et al. | 73/862.53 |
| 5,016,420 | 5/1991 | Chiappe et al. | 53/138.1 |
| 5,100,009 | 3/1992 | Thompson et al. | 215/341 |
| 5,113,710 | 5/1992 | Wolfbauer, III | 73/862.541 |
| 5,146,791 | 9/1992 | Peter et al. | 73/862.49 |

Primary Examiner—Richard E. Chilcot, Jr.
Assistant Examiner—Elizabeth L. Dougherty
Attorney, Agent, or Firm—Hopkins & Thomas

[57] ABSTRACT

A workstation at a packaging machine with a tool having an upper part (2) and a lower part (3) whereby at least one of said parts (3) is driven with a stroke-type movement and a compressive force is exerted via said tool onto a workpiece (4) in the working position, and said tool has a spring arrangement (26), the prestress and deflection path of which can be adjusted. A device (25) for measuring the compressive force on the workpiece (4) in the working position is provided and so located in the area of the upper and/or lower part (2 and/or 3) of the tool that it is loaded by the compressive force in the working position.

22 Claims, 3 Drawing Sheets

5,307,692

WORKSTATION AT A PACKAGING MACHINE

FIELD OF THE INVENTION

The invention refers to a workstation at a packaging machine, in particular a thermoforming station, with a tool having an upper part and a lower part whereby at least one of said parts is driven with a stroke-type movement and a compressive force is exerted via said tool onto a workpiece in the working position, whereby the tool has a spring arrangement, the prestress and deflection path of which in the working position can be adjusted. Such workstations are understood to include, in particular, shaping or sealing stations for manufacturing or sealing of packaging containers deep drawn from thermoplastic synthetic foil. The tool has two parts which may, in an appropriate arrangement, be designated as an upper and a lower part and one of which is driven with a stroke-type movement while the other part is either arranged in a stationary position or is likewise driven or, in any case, can be moved to another position. In a sealing station, a lidding foil is sealed onto the moulded foil web under the action of a compressive force. The two foil webs, which are moved with a stepped motion through the entire packaging machine and, thereby, are also worked on at other workstations, represent the workpiece.

BACKGROUND OF THE INVENTION

A workstation of the type described above is known. It is constructed as a sealing station at a thermoforming machine. The tool is formed by an upper and lower part, whereby the lower part is driven with a stroke-type movement via a bell crank lever mechanism and acts upon the workpiece, namely the two foil webs, in the working position which represents the closed position of the tool. In doing this it is important that the workpiece is worked upon under compressive force. In order to achieve such a reproducible compressive force, spring arrangements are known which consist of one or more springs. These spring arrangements are provided in the path of one of the two parts of the tool and serve the purpose of creating the compressive force not via the bell crank lever mechanism in direct frame-type support on the workpiece, but rather to allow the force of the spring arrangement to act on the workpiece in the closed position of the tool which might be the working position. For this purpose, the spring arrangement is somewhat compressed in the working position. The spring arrangement is provided in a fettered position. It is known to arrange the prestress and the spring deflection path so that they may both be adjusted. By prestress is meant the force with which the spring arrangement is prestressed in the open position of the tool. By spring deflection path is meant the path through which the spring assembly was compressed into the working position. It is understood that the compressive force, corresponding to the compression or rather, the deflection path of the spring arrangement, exerted by the spring arrangement on the workpiece is greater than the prestress set in the open position of the tool. The setting of the prestress and the spring deflection path is carried out according to the dimensional specifications of the manufacturer of the workstation. As the synthetic foils forming the workpiece have different properties according to the particular case, i.e. in particular, different thicknesses or tolerance ranges for the thicknesses, it is necessary, for correct functioning of the workstation to readjust or rather set the compressive force, for example so that in a sealing station, the lidding foil is so sealed onto the cup foil that long-term tightness is achieved. Accordingly, the setting of the prestress is altered or rather, adapted to a process which is dependent on the skill of the operator. Alterations to the prestress as a consequence of aging, breakage, setting of the spring arrangement, etc. can have a disadvantageous effect on production results and can often remain unnoticed over long production cycles. It can also happen that a lidding foil only becomes detached after several days or even weeks so that appropriate inspections directly after sealing do not detect this error which occurs as a result of a deviation to the compressive force. The number of rejects which can be produced in this way can be considerable.

A workstation at a packaging machine, the basic arrangement of which is comparable to the foregoing, is also known from DE-AS 26 56 219. The spring arrangement is formed by a single Bellville spring washer, neither the prestress nor the spring deflection path of which are adjustable. It is not possible to satisfy the required operating conditions in this manner. However, the workstation does have the advantage of an overload safety device essentially consisting of two gear wheels which can be turned against each other so that, in one position, the teeth support each other but, however, in the other position, in which the gear wheels are offset against each other by half of one pitch, a power support is avoided.

SUMMARY OF THE INVENTION

It is the object of the invention to so equip a workstation of the aforementioned type that the compressive force, which acts on the workpiece in the working position, can be better and more precisely adjusted and can be reproducibly maintained.

According to the invention, this is achieved in the workstation of the aforementioned type in that a device is provided for measuring the compressive force on the workpiece in the working position and is so located in the area of the upper and/or lower part of the tool that it is loaded by the compressive force in the working position. As a rule, the working position is the closed position of the two parts of the tool. In this position the parts of the tool act on the workpiece and the device for measuring the compressive force on the tool is switched on in the path of the force. Therefore, it is for the first time possible to measure and monitor the compressive force. This can be carried out at intervals, for example, when adjusting the workstation, or also continually, during every working cycle so that, for example, a recording of the compressive force can prove that, for example, each of the workpieces produced in the batch concerned is sealed according to requirements. This is important for the packaging of medicaments, for example, ampules, in a covered cup foil. Using this new device it is possible to accurately set the compressive force to a predetermined or required value or also to values obtained through experience. Readjustment, necessary for a number of different reasons, is also possible at any time. For example, the type and thickness of the foil to be worked upon may vary. Also, a compressive force depending on the format size may be specified. The new device is further equipped to continuosly monitor the compressive force during production. Spring fractures in the spring arrangement are detected immediately and can be indicated or can trigger a halting of the packaging machine so that the production of rejects is avoided. Other types of sequential switchings are also possible. The mos important advantage is the continuous monitoring of the correct functioning of the spring arrangement and maintaining the compressive force within certain tolerance limits. Deviations from the tolerances, for example, could occur if a tablet lodged between the upper and lower parts and thus becomes an obstacle. The packaging machine could then be halted immediately, thus preventing any damage. According to the location of the device for measuring the compressive force, the setting of the prestress in the spring arrangement, i.e. not in the working position, can also be measured so that the prestress in the spring arrangement may be set precisely to a desired value taking into account the spring deflection path. For achieving this, the device for measuring the compressive force is located at the part of the tool on which the spring assembly is also mounted. The device is arranged in series or in parallel with the spring assembly or rather, spring arrangement. In the case of a series arrangement, one support of the device for measuring the compressive force is supported on the spring arrangement.

The device for measuring the compressive force and the spring arrangement can be fettered in series in the drive train or on the support side of the upper part or lower part of the tool. Thereby, the spring prestress can be measured outside of the working position, i.e. in the open position of the tool, the position in which the adjustment is preferably carried out.

The spring arrangement can consist of a single spring. However, it is advisable for the spring arrangement to be composed of a series of Belleville spring washers which are supported on one side by the device for measuring the compressive force and on the other by a bush, whereby the bush for adjusting the spring deflection path is seated in a thread in a housing. Determining and adjusting the spring deflection path produces the compression of the spring arrangement in the working position and, therewith, the compressive force which is transferred to the workpiece.

A rod can be connected to the lower part of the tool; said rod passes through the bush and is supported on the bush via a screw facility for adjusting the prestress in the Belleville spring washers. This represents one possible simple configuration.

The device for measuring the compressive force can be contructed as a weighing cell, force receiver or similar. Further possibilities will also appear to those skilled in this field.

A control unit can be allocated to the device for measuring the compressive force, whereby said control unit can be connected to the drive for the workstation or the entire packaging machine in order to, for example, bring the packaging machine to a halt if the compressive force deviates from the force set. A warning device in the form of a horn or a visible signal can be provided in order to avoid long stoppages.

It is also possible that an overload safety device for protecting the spring arrangement may be allocated to the device for measuring the compressive force. This overload safety device can be controlled depending on the chronological progression of the compressive force. If a compressive force appears within a working cycle at a time at which no such force should appear, then this is a sign that an obstacle is present between the two parts of the tool, making it necessary to actuate the overload safety device accordingly. The overload safety device can have a coupling which may be released and is controlled by the device for measuring the compressive force. Thereby, if the workpiece is not worked on according to the correct procedure and another stroke is performed there remains enough time, for example, to stop even a fast packaging machine.

BRIEF DESCRIPTION OF THE DRAWINGS

The workstation according to the invention will be further explained and described by means of preferred embodiment examples.

DETAILED DESCRIPTION

Figure 1:
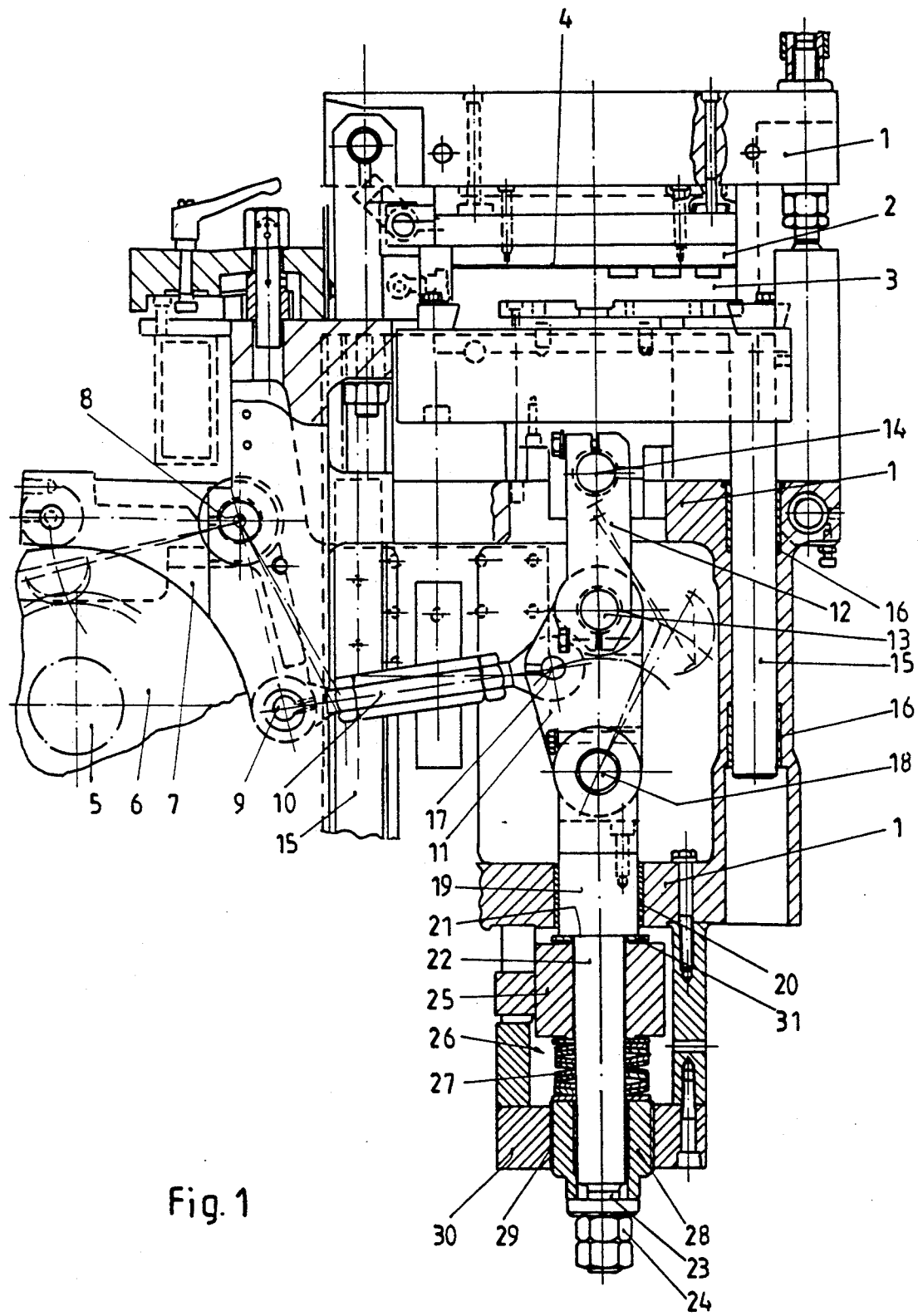
FIG. 1 shows a vertical cross-section through a workstation constructed as a sealing station with the parts essential to the work station.
Figure 2:
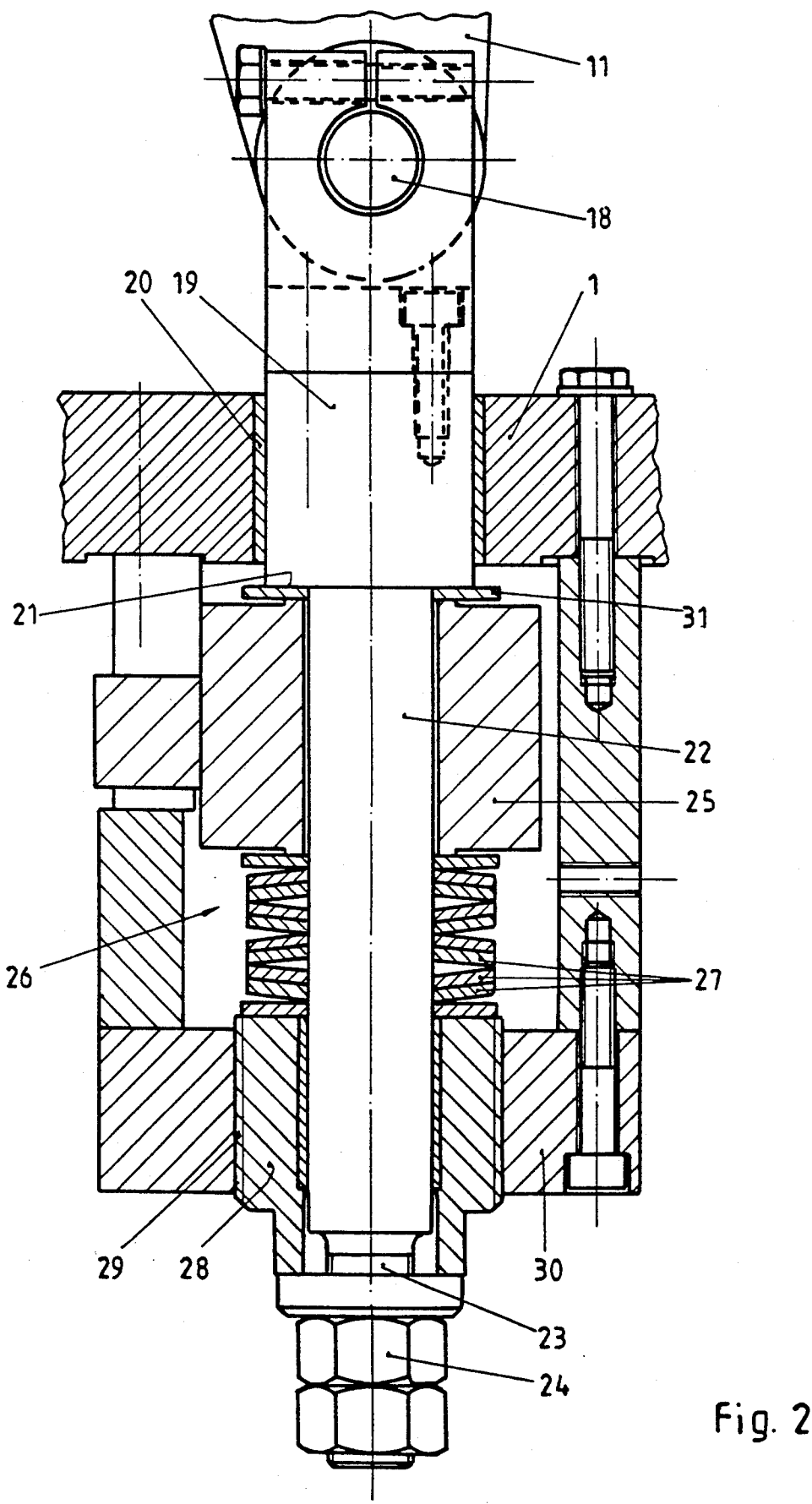
FIG. 2 shows an enlarged illustration of the workstation according to FIG. 1 for clarifying the device for measuring the compressive force.

The workstation illustrated in cross-section in FIG. 1 has a frame 1 made up of several parts upon which an upper part 2 and a lower part 3 of a tool 2, 3 are located. The upper part 2 is fixed to the frame 1 while the lower part 3 is mounted such that it may move in the vertical direction with respect to the frame 1. The workpiece 4 to be worked upon is moved with a stepwise motion and stopped between the upper part 2 and the lower part 3, whereby during standstill in the working position the working on the work piece is performed e.g. by sealing a lidding foil onto a cup foil, which together form the workpiece 4. The tool 2, 3 can have the upper part 2 and the lower part 3 directly engaged. However, it is also possible to use tool inserts which are arranged such that they may be exchanged. A drive is provided for moving the lower part 3 back and forth relative to the upper part 2, whereby this drive is frequently derived from the complete drive for the packaging machine. Such a drive shaft 5, passing through the entire packaging machine, is indicated schematically. A cam disc 6 is mounted on this drive shaft 5 and the perimeter of said cam disc has, for example, a curved path which works in conjunction with a swinging arm 7, mounted on frame 1 by means of a joint 8 such that it may swing back and forth. On the other end of the swinging arm 7 there is a pushrod 10 which engages with said arm via a joint 9 which is movable with respect to the frame 1; said pushrod is constructed such that adjustments to the length may be carried out. The pushrod 10 leads to a bell crank lever mechanism having levers 11 and 12 connected to each other via knee joint 13. The dead center position is illustrated in FIG. 1 by the continuous lines while the open position of the bell crank lever mechanism is shown by means of dotted lines. Lever 12 of the bell crank lever mechanism finally engages via joint 14 with the lower part 3 of tool 2, 3. For guiding the lower part 3 on frame 1, guide rods 15 are connected to lower part 3 and said guide rods are guided in slide bearings 16 on frame 1. The pushrod 10 engages via joint 17 with lever 11. Lever 11 is mounted via joint 18 on a thrust pad 19 which is guided in a vertical direction via slide bearing 20 on frame 1. The thrust pad 19 continues via a shoulder 21 into a rod 22 and finishes in a threaded shank 23, upon which at least one adjusting nut 24 is fitted. Here, rod 22 passes through the device 25 for measuring the compressive force on the workpiece 4. Measuring device 25 can consist of a weighing cell, force receiver, piezoelectric element or similar. One side of the device 25 is supported on the shoulder 21 of the thrust pad 19. The other side is supported on a spring arrangement 26 which is here made up of an assembly of Belleville spring washers 27. In principle, one single spring is sufficient for the make-up of spring arrangement 26. The spring arrangement 26 is in turn supported on a bush 28 which can be adjusted via a thread 29 on a yoke 30, whereby the yoke 30 is connected to the frame 1. The adjusting nut 24 is supported by the bush 28 so that, hereby, the device 25 and the spring arrangement 26 are fettered in series. Turning the adjusting nut 24 relative to the threaded shank 23 leads to an alteration or rather an adjustment of the prestress in the spring arrangement 26. Turning bush 28 in thread 29 leads to an adjustment or rather an alteration to the spring deflection path of the spring arrangement 26 in the working position. The adjustment of both variables relative to each other produces the adjustability of the compressive force for the parts of the tool 2, 3 on the workpiece 4 in the working position.

As the device 25 is arranged in the area of the spring assembly 26, a parallel arrangement would also be possible. The prestress of the spring arrangement 26 can also be measured by means of device 25 in the open position of the bell crank lever mechanism or rather, parts 2 and 3 of tool 2, 3. Therefore, the prestress can also be set precisely to a certain value. The bell crank lever mechanism merely serves for transferring the movement, not for generating the compressive force. In the working position, i.e. when the workpiece 4 is clamped between the upper part 2 and lower part 3 and the compressive force is transmitted the device 25 or an intemediate washer 31 on shoulder 21 will lift from frame 1 so that the compressive force corresponding to the compression of the spring assembly 26 is transmitted to the workpiece 4. As this compressive force is directed via device 25, it is measured there and sequential switchings can be carried out. For example, it is possible to set a range of compressive force and to trigger a signal if this range is exceeded, whereby said signal, for example, stops the bell crank lever mechanism or also the drive for the entire packaging machine. It is also possible to measure and record the compressive force at every operating cycle in order to establish with documentary evidence that the sealing is carried out under the action of a defined compressive force. Further possibilities are conceivable.

In the open position of the bell crank mechanism, i.e. when the upper part 2 and the lower part 3 are so distanced from each other that the workpiece 4 is no longer clamped, the washer 31 or rather, therewith device 25 as well, reaches its support in the area of the thrust pad 19 on frame 1 so that the prestress in the spring arrangement 26 is supported at frame 1. The bell crank lever mechanism is free of any forces.

Figure 3:
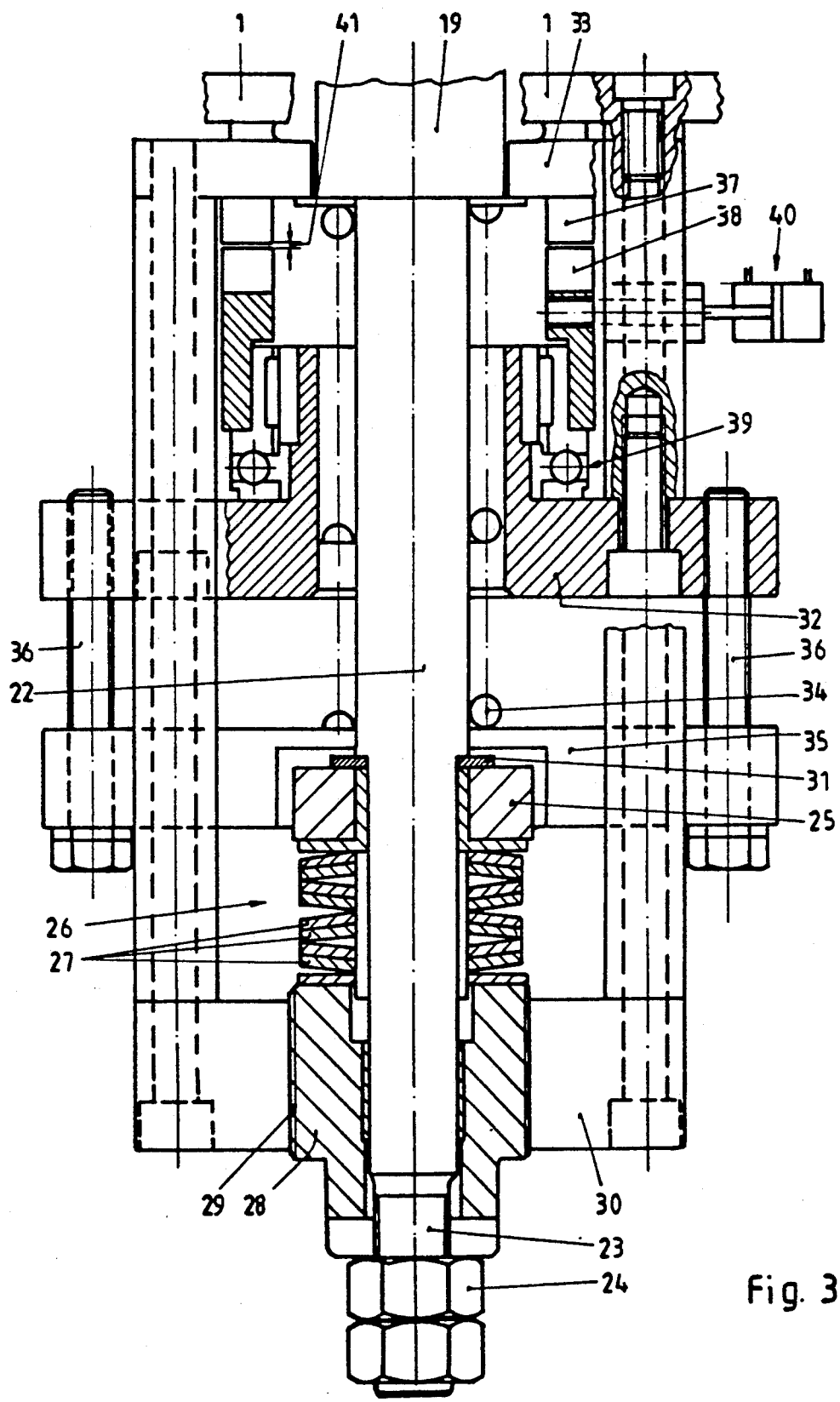
FIG. 3 shows a sectional view of essential parts of the workstation with the additional facility of an overload safety device.

FIG. 3 shows once again the parts of the workstation essential to the its operation, but with the addition of an overload safety device. Yoke 32 is firmly connected, for example, screwed, to the frame. Yoke 30 on the other hand is connected via a screwed connection to plate 33 which abuts against frame 1 in the open position of tool 2, 3. The support is achieved via a safety spring 34, the other end of which is supported on a bearing plate 35. The bearing plate 35 is connected via bolts 36 to yoke 32. Thus, the prestress of the safety spring 34 can by adjusted via bolts 36. The safety spring 34 is designed considerably weaker than the spring arrangement 26 consisting of Belleville spring washers 27. Therefore, the force of the safety spring is, for example, in the order of magnitude of 200 to 400 kp, whereas the force of the Belleville spring washers 27 lies in the order of magnitude of 5000 kp. The thrust pad 19 here also has a rod 22 which is formed correspondingly offset and penetrates the safety spring 34, device 25 and the spring arrangement 26. The bush 28 is also provided in a similar fashion and formed so that the spring deflection path may be adjusted via thread 29.

The safety spring 34 belongs to the overload safety device. Further parts of the overload safety device are a crown gear 37 connected to plate 33, and a crown gear 38 which is mounted via a thrust bearing 39 and which can be turned at least one half of a tooth pitch on yoke 32. A drive 40, for example, a pneumatic cylinder, is provided for driving crown gear 38 by one half of a tooth pitch relative to crown gear 37. The normal position of the two crown wheels 37 and 38 opposite each other is such that the crests of the teeth are opposite each other in the axial direction. Thereby, only a relatively small clearance 41 is provided which is passed through at first when the bell crank lever mechanism moves. In operation crown gear 37 engages with crown gear 38 so that, therefore, plate 33 and the yoke 30 connected to it is supported stationary against frame 1. The safety spring 34 is slightly compressed. Each further movement of parts 2 and 3 of the tool towards each other then leads to a compression of the spring arrangement 26 so that the workpiece is loaded with the set compressive force which in turn can be measured via device 25. If the desired compressive force is exceeded, as shown by device 25, then an obstacle is present between parts 2 and 3 of the tool. This increased compressive force can be utilized to actuate the drive 40 and, therewith, trigger the overload safety device. The crown gear 38 is turned through one half of a pitch so that the teeth of one crown gear are now opposite the troughs of the other crown gear. One further downward movement of thrust pad 19 and rod 22 then leads to the unit consisting of plate 33 and yoke 30 also being dragged down wards, whereby in doing this, the bush 28 can deflect and, therefore, the compressive force normally exerted in the spring arrangement 26 cannot build up. The tool 2, 3 is protected in this way. Also in this case, a signal can be derived and, for example, utilized for stopping the station or eliminating the obstacle. The overload safety device can be preferably so operated that it only responds in a dangerous situation so that the drive 40 is not normally brought into operation. However, it is also possible to carry out the relative turning of the crown gears 37 and 38 at every work cycle so that the force-type support can then be carried out here, while only in the case of an obstacle is this turning not performed or cancelled.

While the invention has been described in detail, it will be understood by those skilled in the art that variations and modifications thereof can be made without departing from the spirit and scope of the invention as set forth in the following claims.

I claim:

1. A workstation of a packaging machine, in particular a thermoforming station, in which a workpiece is sealed, comprising, a tool having an upper part and lower part disposed along a common axis, drive means for moving at least one of said parts with a stroke type movement toward and away from the other of said parts for driving at least one of said parts into working and open positions along said axis and for exerting a compressive force by said tool onto the workpiece, spring means disposed upon said tool for providing said compressive force, means for adjusting the prestress and deflection path of said spring means, and means for measuring the compressive force on the workpiece and the prestress of said spring means when said lower part is in its open position.

2. The workstation of claim 1, wherein said measuring means is disposed upon said tool.

3. The workstation of claim 2, wherein said measuring means is disposed upon said tool adjacent said spring means.

4. The workstation of claim 3, wherein said measuring means and said spring means are adjacent each other upon either said first or said second part of said tool along said axis.

5. The workstation of claim 4, wherein said spring means further comprises a plurality of Belleville spring washers which are supported on one side by said measuring means and on the other side by a threaded bush for adjusting the deflection path of said tool.

6. The workstation of claim 5, wherein said means for adjusting the prestress of said spring means further comprises a rod disposed along said common axis having a first and second end, the first end of which is connected to the lower part of the tool, the second end of which passes through and is supported on the bush, and at least one threaded nut disposed upon said second end for adjusting the prestress of the Belleville spring washers.

7. The workstation of claim 1, wherein said measuring means further comprises a weighing cell and a force receiver.

8. The workstation of claim 1, wherein said measuring means further comprises a control unit connected to the drive means for the driven part of said tool.

9. The workstation of claim 8, further comprising an overload safety device for protecting the spring means, wherein said safety device is connected to said measuring means.

10. The workstation of claim 9, wherein the overload safety device further comprises a gear coupling which is held in a closed position and is releasable into an open position by said measuring means.

11. In a thermoforming packaging machine workstation having a frame with a tool having first and second parts disposed along a common axis, and drive means for reciprocating said second part toward and away from said first part into working and open positions with respect to said first part, and between which a workpiece is compressively sealed, the improvement comprising:

spring means for limiting the sealing force applied by said second piece against said first piece and the workpiece;

measuring means for determining the prestress of said spring means in both the working and open position of said tool; and adjusting means for changing the resistance applied by said spring means;

whereby said measuring means measures the resistance of said spring mean when said second part is in the working position during each work cycle, and said measuring means and said adjusting means are usable together to measure and set the prestress of said spring means.

12. The packaging thermoforming machine workstation of claim 11, wherein said spring means is disposed upon said tool.

13. The packaging thermoforming machine workstation of claim 12, wherein said measuring means is disposed upon said tool.

14. The packaging thermoforming machine workstation of claim 13, wherein said spring means is located adjacent said measuring means upon said tool.

15. The packaging thermosetting machine workstation of claim 11, wherein said spring means further comprises a plurality of Belleville washers disposed upon said tool along said axis.

16. The packaging thermoforming machine workstation of claim 15, wherein said Belleville washers are disposed upon said tool and supported on one side by said measuring means, and on the other side by said adjusting means.

17. The packaging thermoforming machine workstation of claim 16, wherein said adjusting means further comprises a cylindrical rod disposed along said common axis having first and second ends, and a hollow cylindrical bush wherein the first end of said rod is connected to and depends downward from the second part of said tool, the second end of which is threaded and passes through said bush, at least one washer disposed upon the second end of said rod adjacent said bush, and at least one nut threaded upon said second rod end adjacent said washer, whereby the compressive force of said spring means is increased by tightening said nut, and decreased by loosening said nut.

18. The packaging thermoforming machine workstation of claim 17, wherein said threaded bush adjusts the relative distance between the first part and second part of said tool without varying the compressive force of said spring means by either tightening or loosening said bush, whereby the lower part of said tool is moved toward and away from said upper part during the open position of said tool while said workstation is at rest.

19. The packaging thermoforming machine workstation of claim 11, wherein said measuring means further comprises a load cell, weighing cell, and a force receiver.

20. The packaging thermoforming machine workstation of claim 11, wherein said measuring means further comprises a control unit for signaling the compressive force within said spring means during the working position of said tool, and the prestress of said spring means in the open position of said tool.

21. The packaging thermoforming machine workstation of claim 20, further comprising an overload safety device wherein said control unit signals said safety device for protecting said spring means and said tool.

22. The packaging thermoforming machine workstation of claim 21, wherein said overload safety device further comprises a gear coupling held in a closed position whereby said workpiece exerts compressive force through the tool, and wherein said gear coupling is releasable into an open position so that tool does not act upon the workpiece.

* * * * *